US009376562B2

(12) United States Patent
Nelliappan et al.

(10) Patent No.: US 9,376,562 B2
(45) Date of Patent: Jun. 28, 2016

(54) THERMOPLASTIC COMPOSITION, METHOD OF PRODUCING THE SAME, AND ARTICLES MADE THEREFROM

(75) Inventors: Veera Nelliappan, North Wales, PA (US); Eric G. Lundquist, North Wales, PA (US); Yannick Saint-Gerard, Roquefort-les-Pins (FR)

(73) Assignee: Rohm and Haas Company, Philadelphia, PA (US)

( * ) Notice: Subject to any disclaimer, the term of this patent is extended or adjusted under 35 U.S.C. 154(b) by 67 days.

(21) Appl. No.: 13/989,925

(22) PCT Filed: Dec. 21, 2011

(86) PCT No.: PCT/US2011/066636
§ 371 (c)(1),
(2), (4) Date: Aug. 12, 2013

(87) PCT Pub. No.: WO2012/088345
PCT Pub. Date: Jun. 28, 2012

(65) Prior Publication Data
US 2013/0317174 A1   Nov. 28, 2013

Related U.S. Application Data

(60) Provisional application No. 61/425,998, filed on Dec. 22, 2010.

(51) Int. Cl.
    *C08L 69/00*   (2006.01)
    *C08L 33/12*   (2006.01)
(52) U.S. Cl.
    CPC  *C08L 69/00* (2013.01); *C08L 33/12* (2013.01)
(58) Field of Classification Search
    None
    See application file for complete search history.

(56) References Cited

U.S. PATENT DOCUMENTS

| 4,876,311 A * | 10/1989 | Hennig et al. ............. 525/229 |
| 5,710,204 A | 1/1998 | Harke et al. |
| 2010/0284170 A1 | 11/2010 | Awaji et al. |

FOREIGN PATENT DOCUMENTS

| GB | 967051 | * | 8/1964 |
| WO | WO2010/089060 | | 8/2010 |
| WO | WO-2012/058256 | * | 5/2012 |

OTHER PUBLICATIONS

EP Office Action dated Jul. 30, 2013; from EP counterpart Application No. 11813495.6.
Instructions to EP Office Action dated Jan. 13, 2014; from EP counterpart Application No. 11813495.6.
EP Response to Office Action dated Jan. 20, 2014; from EP counterpart Application No. 11813495.6.
PCT Search Report dated Apr. 3, 2013; from PCT counterpart Application No. PCT/US2011/066636.
PCT IPRP dated Jul. 22, 2013; from PCT counterpart Application No. PCT/US2011/066636.
EPO Office Action dated Sep. 29, 2014 with associate letter for counterpart EPO Application No. 11813495.6, 6 pages.
Chinese Office Action dated Nov. 15, 2014 for counterpart Chinese Application No. 201180068251.8, 6 pages.
Response to EPO Office Action dated Sep. 29, 2014 for counterpart European Application No. 11813495.6, 19 pages.
Response to Chinese Office Action dated Nov. 15, 2014 filed Mar. 27, 2015 for counterpart Chinese Application No. 201180068251.8, 6 pages.
European Patent Office Action dated May 12, 2015 for counterpart European Application No. 11813495.6, 3 pages.
Chinese Second Office Action dated Jul. 17, 2015 for Chinese Application No. 201180068251.8, 10 pages.
Response to Chinese Second Office Action dated Jul. 17, 2015 filed Oct. 19, 2015 for Chinese Application No. 201180068251.8, 7 pages.
Response to EPO Communication pursuant to Article 94(3) EPC dated May 12, 2015 filed Sep. 1, 2015 for European Application No. 11813495.6, 31 pages.
Japanese Office Action dated Jun. 16, 2015 for Japanese Application No. 2013-546393, 4 pages.
Response to Japanese Office Action dated Jun. 16, 2015 for Japanese Application No. 2013-546393, 3 pages.
Japanese Office Action dated Mar. 6, 2016; from Japanese counterpart Application No. 2013-546393.

* cited by examiner

*Primary Examiner* — David Buttner

(57) ABSTRACT

A thermoplastic composition comprising from 60 percent to 99 percent by weight of one or more thermoplastic polymers; and from 40 percent to 1 percent by weight of an additive comprising a crosslinked (meth)acrylate polymer, wherein the crosslinked methylmethacrylate polymer comprises at least 99.5 percent by weight derived from methyl methacrylate units, and from greater than zero to less than 0.5 percent by weight derived from one or more multifunctional crosslinking monomers; wherein the crosslinked (meth)acrylate polymer has a volume average particle size of equal to or less than 1.0 micron; and wherein an article produced from the scratch-resistant thermoplastic composition has a hardness of greater than F is provided. Also provided are a method of making the thermoplastic composition, articles made from the polycarbonate composition, and a method of making the articles.

8 Claims, No Drawings

THERMOPLASTIC COMPOSITION, METHOD OF PRODUCING THE SAME, AND ARTICLES MADE THEREFROM

FIELD OF INVENTION

The instant invention relates to a thermoplastic composition, method of producing the same, and articles made therefrom.

BACKGROUND OF THE INVENTION

Thermoplastic resins and blends of thermoplastic resins are used in the production of electronic and optical articles for which light weight, good mechanical strength, heat and dimensional stability are required. As such, thermoplastics such as polycarbonate (PC) and polycarbonate blends such as PC/ABS and PC/PBT have found utility in a wide range of applications.

Some such thermoplastic resins, however, exhibit poor scratch resistance having as low as a B grade of pencil hardness. Poor scratch resistance frequently limits the use of such resins in many applications including in optical, automotive, and electronic industries in which a pencil hardness of at least F and, preferably, at least H is required. Methods have been developed to increase the pencil hardness of polycarbonate including, for example, curing an acrylic coating onto the surface of a polycarbonate-based article. Although successful in increasing the pencil hardness, this method requires an additional step that is expensive and often difficult to control. Another method to improve the pencil hardness uses alloys of polycarbonate and (meth)acrylates, preferably polymethylmethacrylate (pMMA). Although polymethylmethacrylate has a pencil hardness of 2H, pMMA is not compatible with polycarbonate under all processing conditions. Moreover, a relatively high level of poly(meth)acrylate polymer and/or copolymer is required to provide polycarbonate with a hardness increase of at least 3 levels on the pencil hardness scale. Efforts to improve the compatibility through the use of (meth)acrylate copolymers have resulted in increased compatibility and transparency, but insufficient increases in scratch resistance.

A need exists for a modified thermoplastic, and, particularly, a modified polycarbonate-based, composition having an increase of three or more levels of hardness on the pencil hardness scale over the unmodified thermoplastic, and, particularly, polycarbonate-based composition so that such modified thermoplastic and polycarbonate-based resins could be used in a broader range of applications.

SUMMARY OF THE INVENTION

The instant invention provides a thermoplastic composition, a method of producing the same, and articles made therefrom, with improved scratch resistance.

In one embodiment, the invention provides a thermoplastic composition comprising: from 60 percent to 99 percent by weight of one or more thermoplastic polymers; and from 40 percent to 1 percent by weight of an additive comprising a crosslinked (meth)acrylate polymer, wherein the crosslinked (meth)acrylate polymer comprises at least 99.5 percent by weight derived from methyl methacrylate units, and from greater than zero to less than 0.5 percent by weight derived from one or more multifunctional crosslinking monomers; wherein the crosslinked (meth)acrylate polymer has a volume average particle size of equal to or less than 1.0 micron; and wherein an article produced from the scratch-resistant thermoplastic composition has a hardness greater than F.

Another embodiment of the invention provides a method for producing a thermoplastic composition comprising: selecting one or more thermoplastic polymers; selecting an additive comprising a crosslinked (meth)acrylate polymer, wherein the crosslinked (meth)acrylate polymer comprises at least 99.5 percent by weight derived from methyl methacrylate units, and from greater than zero to less than 0.5 percent by weight derived from one or more multifunctional crosslinking monomers; melt kneading the additive into the thermoplastic polymer; thereby producing the thermoplastic composition, wherein the thermoplastic composition comprises from 60 to 99 percent by weight of the one or more thermoplastic polymers, and from 40 to 1 percent by weight of the additive, based on the total weight of the thermoplastic composition, wherein the crosslinked (meth)acrylate polymer has a volume average particle size of equal to or less than 1.0 micron; and wherein an article produced from the scratch-resistant thermoplastic composition has a hardness greater than F.

Another embodiment of the invention provides an article comprising: a thermoplastic composition comprising the melt blending product of: from 60 to 99 percent by weight of one or more thermoplastic polymers, and from 40 to 1 percent by weight of an additive comprising a crosslinked (meth)acrylate polymer, wherein the crosslinked (meth)acrylate polymer comprises at least 99.5 percent by weight derived from methyl methacrylate units, and from greater than zero to less than 0.5 percent by weight derived from one or more multifunctional crosslinking monomers; wherein the crosslinked (meth)acrylate polymer has a volume average particle size of equal to or less than 1.0 micron; and wherein the article has a hardness greater than F.

Another embodiment of the invention provides a method for forming an article comprising: selecting a thermoplastic composition comprising the melt blending product of: from 60 to 99 percent by weight of one or more thermoplastic polymers, and from 40 to 1 percent by weight of an additive comprising a crosslinked (meth)acrylate polymer, wherein the crosslinked (meth)acrylate polymer comprises at least 99.5 percent by weight derived from methyl methacrylate units, and from greater than zero to less than 0.5 percent by weight derived from one or more multifunctional crosslinking monomers; wherein the crosslinked (meth)acrylate polymer has a volume average particle size of equal to or less than 1.0 micron; and forming said thermoplastic composition into said article wherein the article has a hardness of greater than F.

In another embodiment, the invention provides a polycarbonate composition comprising: from 60 percent to 99 percent by weight of one or more polycarbonate polymers; and from 40 percent to 1 percent by weight of an additive comprising a crosslinked (meth)acrylate polymer, wherein the crosslinked (meth)acrylate polymer comprises at least 99.5 percent by weight derived from methyl methacrylate units, and from greater than zero to less than 0.5 percent by weight derived from one or more multifunctional crosslinking monomers; wherein the crosslinked (meth)acrylate polymer has a volume average particle size of equal to or less than 1.0 micron; and wherein an article produced from the scratch-resistant polycarbonate composition has a hardness greater than F.

Another embodiment of the invention provides a method for producing a polycarbonate composition comprising: selecting one or more polycarbonate polymers; selecting an additive comprising a crosslinked (meth)acrylate polymer, wherein the crosslinked (meth)acrylate polymer comprises at least 99.5 percent by weight derived from methyl methacrylate units, and from greater than zero to less than 0.5 percent by weight derived from one or more multifunctional crosslinking monomers; melt kneading the additive into the one or more polycarbonate polymers; thereby producing the polycarbonate composition, wherein the polycarbonate composition comprises from 60 to 99 percent by weight of the one or more polycarbonate polymers, and from 40 to 1 percent by weight of the additive, based on the total weight of the polycarbonate composition, wherein the crosslinked (meth)acrylate polymer has a volume average particle size of equal to or less than 1.0 micron; and wherein an article produced from the scratch-resistant thermoplastic composition has a hardness greater than F.

Another embodiment of the invention provides an article comprising: a polycarbonate composition comprising the melt blending product of: from 60 to 99 percent by weight of one or more polycarbonate polymers, and from 40 to 1 percent by weight of an additive comprising a crosslinked (meth)acrylate polymer, wherein the crosslinked (meth)acrylate polymer comprises at least 99.5 percent by weight derived from methyl methacrylate units, and from greater than zero to less than 0.5 percent by weight derived from one or more multifunctional crosslinking monomers; wherein the crosslinked (meth)acrylate polymer has a volume average particle size of equal to or less than 1.0 micron; and wherein the article has a hardness greater than F.

Another embodiment of the invention provides a method for forming an article comprising: selecting a polycarbonate composition comprising the melt blending product of: from 60 to 99 percent by weight of one or more polycarbonate polymers, and from 40 to 1 percent by weight of an additive comprising a crosslinked (meth)acrylate polymer, wherein the crosslinked (meth)acrylate polymer comprises at least 99.5 percent by weight derived from methyl methacrylate units, and from greater than zero to less than 0.5 percent by weight derived from one or more multifunctional crosslinking monomers; wherein the crosslinked (meth)acrylate polymer has a volume average particle size of equal to or less than 1.0 micron; and forming said polycarbonate composition into said article wherein the article has a hardness of greater than F.

In an alternative embodiment, the instant invention provides a thermoplastic or polycarbonate composition, method of producing the same, articles made therefrom, and method of making such articles, in accordance with any of the preceding embodiments, except that the crosslinked (meth)acrylate polymer has a volume average particle size from 50 to 1000 nm.

In an alternative embodiment, the instant invention provides a thermoplastic or polycarbonate composition, method of producing the same, articles made therefrom, and method of making such articles, in accordance with any of the preceding embodiments, except that the crosslinked (meth)acrylate polymer has a volume average particle size from 100 to 700 nm.

In an alternative embodiment, the instant invention provides a thermoplastic or polycarbonate composition, method of producing the same, articles made therefrom, and method of making such articles, in accordance with any of the preceding embodiments, except that the crosslinked (meth)acrylate polymer has a volume average particle size from 150 to 600 nm.

In an alternative embodiment, the instant invention provides a thermoplastic or polycarbonate composition, method of producing the same, articles made therefrom, and method of making such articles, in accordance with any of the preceding embodiments, except that the crosslinked (meth)acrylate polymer has a Tg from 90° C. to 115° C. (measured by DSC, second heat).

In an alternative embodiment, the instant invention provides a thermoplastic or polycarbonate composition, method of producing the same, articles made therefrom, and method of making such articles, in accordance with any of the preceding embodiments, except that the crosslinked (meth)acrylate polymer has a Tg from 105° C. to 115° C. (measured by DSC, second heat).

In an alternative embodiment, the instant invention provides a thermoplastic or polycarbonate composition, method of producing the same, articles made therefrom, and method of making such articles, in accordance with any of the preceding embodiments, except that the crosslinked (meth)acrylate polymer has a Tg from 100° C. to 130° C. (measured by DSC, second heat).

In an alternative embodiment, the instant invention provides a thermoplastic or polycarbonate composition, method of producing the same, articles made therefrom, and method of making such articles, in accordance with any of the preceding embodiments, except that the crosslinked (meth)acrylate polymer has a Tg from 100° C. to 125° C. (measured by DSC, second heat).

In an alternative embodiment, the instant invention provides a polycarbonate composition, method of producing the same, articles made therefrom, and method of making such articles, in accordance with any of the preceding embodiments, except that the crosslinked (meth)acrylate polymer is obtained by an emulsion polymerization reaction.

In an alternative embodiment, the instant invention provides a thermoplastic or polycarbonate composition, method of producing the same, articles made therefrom, and method of making such articles, in accordance with any of the preceding embodiments, except that the crosslinking monomer is selected from the group consisting of aromatic crosslinking monomers including divinylbenzene; vinyl group-containing monomers and allyl compounds including allyl (meth)acrylate, diallyl fumarate, diallyl phthalate, diallylacrylamide, triallyl (iso)cyanurate, and triallyl trimelitate; (poly)alkylene glycol di(meth)acrylate compounds including 1,6-hexanediol di(meth)acrylate, (poly)ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, trimethylolpropane tri(meth)acrylate, dipentaerythritol hexa(meth)acrylate, dipentaerythritol penta(meth)acrylate, and glycerol tri(meth)acrylate and mixtures and combination thereof.

In an alternative embodiment, the instant invention provides a thermoplastic or polycarbonate composition, method of producing the same, articles made therefrom, and method of making such articles, in accordance with any of the preceding embodiments, except that the thermoplastic or polycarbonate composition further comprises one or more end use additives selected from the group consisting of flame retardants, antimicrobial agents, lubricants, heat stabilizers, antioxidants, light-stabilizers, compatibilizers, dyes, inorganic additives, surfactants, nucleating agents, coupling agents, fillers, impact modifiers, colorants, stabilizers, slip agents, anti-static compounds, and pigments.

In an alternative embodiment, the instant invention provides a thermoplastic or polycarbonate composition, method of producing the same, articles made therefrom, and method of making such articles, in accordance with any of the preceding embodiments, except that the crosslinked (meth)acrylate polymer is free of chain transfer agents.

In an alternative embodiment, the instant invention provides a thermoplastic or polycarbonate composition, method of producing the same, articles made therefrom, and method of making such articles, in accordance with any of the preceding embodiments, except that the one or more thermoplastic or polycarbonate polymers are selected from the group consisting of polycarbonate, polycarbonate blends such as PC/ABS and PC/PBT, polyesters (PET, PBT), polyamide, polystyrene, polylactic acid, blends thereof and combinations thereof.

In an alternative embodiment, the instant invention provides a thermoplastic or polycarbonate composition, method of producing the same, articles made therefrom, and method of making such articles, in accordance with any of the preceding embodiments, except that the thermoplastic or polycarbonate composition comprises from 70 to 90 weight percent of the one or more thermoplastic or polycarbonate polymers and from 10 to 30 weight percent additive.

In an alternative embodiment, the instant invention provides a thermoplastic or polycarbonate composition, method of producing the same, articles made therefrom, and method of making such articles, in accordance with any of the preceding embodiments, except that the additive comprises from greater than zero to less than or equal to 0.5 percent by weight EGDMA.

In an alternative embodiment, the instant invention provides a polycarbonate or thermoplastic composition, method of producing the same, articles made therefrom, and method of making such articles, in accordance with any of the preceding embodiments, except that the additive comprises from greater than zero to less than or equal to 0.1 percent by weight TMPTA.

In an alternative embodiment, the invention provides a thermoplastic or polycarbonate composition consisting essentially of: from 60 percent to 99 percent by weight of one or more thermoplastic or polycarbonate polymers; and from 40 percent to 1 percent by weight of an additive comprising a crosslinked (meth)acrylate polymer, wherein the crosslinked (meth)acrylate polymer comprises at least 99.5 percent by weight derived from methyl methacrylate units, and from greater than zero to less than 0.5 percent by weight derived from one or more multifunctional crosslinking monomers; wherein the crosslinked (meth)acrylate polymer has a volume average particle size of equal to or less than 1.0 micron; and wherein an article produced from the scratch-resistant thermoplastic composition has a hardness greater than F.

In an alternative embodiment, the invention provides a thermoplastic or polycarbonate composition comprising: from 60 percent to 99 percent by weight of one or more thermoplastic or polycarbonate polymers; and from 40 percent to 1 percent by weight of an additive consisting essentially of a crosslinked (meth)acrylate polymer, wherein the crosslinked (meth)acrylate polymer comprises at least 99.5 percent by weight derived from methyl methacrylate units and from greater than zero to less than 0.5 percent by weight derived from one or more multifunctional crosslinking monomers; wherein the crosslinked (meth)acrylate polymer has a volume average particle size of equal to or less than 1.0 micron; and wherein an article produced from the scratch-resistant thermoplastic composition has a hardness greater than F.

Another embodiment of the invention provides a method for producing a thermoplastic or polycarbonate composition consisting essentially of: selecting one or more thermoplastic or polycarbonate polymers; selecting an additive comprising a crosslinked (meth)acrylate polymer, wherein the crosslinked (meth)acrylate polymer comprises at least 99.5 percent by weight derived from methyl methacrylate units, and from greater than zero to less than 0.5 percent by weight derived from one or more multifunctional crosslinking monomers; melt kneading the additive into the one or more thermoplastic or polycarbonate polymers; thereby producing the thermoplastic or polycarbonate composition, wherein the thermoplastic or polycarbonate composition comprises from 60 to 99 percent by weight of the one or more thermoplastic or polycarbonate polymers, and from 40 to 1 percent by weight of the additive, based on the total weight of the thermoplastic or polycarbonate composition, wherein the crosslinked (meth)acrylate polymer has a volume average particle size of equal to or less than 1.0 micron; and wherein an article produced from the scratch-resistant thermoplastic or polycarbonate composition has a hardness greater than F.

Another embodiment of the invention provides a method for producing a thermoplastic or polycarbonate composition comprising: selecting one or more thermoplastic or polycarbonate polymers; selecting an additive consisting essentially of a crosslinked (meth)acrylate polymer, wherein the crosslinked (meth)acrylate polymer comprises at least 99.5 percent by weight derived from methyl methacrylate units, and from greater than zero to less than 0.5 percent by weight derived from one or more multifunctional crosslinking monomers; melt kneading the additive into the one or more polycarbonate polymers; thereby producing the thermoplastic or polycarbonate composition, wherein the thermoplastic or polycarbonate composition comprises from 60 to 99 percent by weight of the one or more thermoplastic or polycarbonate polymers, and from 40 to 1 percent by weight of the additive, based on the total weight of the thermoplastic or polycarbonate composition, wherein the crosslinked (meth)acrylate polymer has a volume average particle size of equal to or less than 1.0 micron; and wherein an article produced from the scratch-resistant thermoplastic or polycarbonate composition has a hardness greater than F.

Another embodiment of the invention provides an article consisting essentially of: a thermoplastic or polycarbonate composition comprising the melt blending product of: from 60 to 99 percent by weight of one or more thermoplastic or polycarbonate polymers, and from 40 to 1 percent by weight of an additive comprising a crosslinked (meth)acrylate polymer, wherein the crosslinked (meth)acrylate polymer comprises at least 99.5 percent by weight derived from methyl methacrylate units, and from greater than zero to less than 0.5 percent by weight derived from one or more multifunctional crosslinking monomers; wherein the crosslinked (meth)acrylate polymer has a volume average particle size of equal to or less than 1.0 micron; and wherein the article has a hardness greater than F.

Another embodiment of the invention provides an article comprising: a thermoplastic or polycarbonate composition consisting essentially of the melt blending product of: from 60 to 99 percent by weight of one or more thermoplastic or polycarbonate polymers, and from 40 to 1 percent by weight of an additive comprising a crosslinked (meth)acrylate polymer, wherein the crosslinked (meth)acrylate polymer comprises at least 99.5 percent by weight derived from methyl methacrylate units, and from greater than zero to less than 0.5 percent by weight derived from one or more multifunctional crosslinking monomers; wherein the crosslinked (meth)acrylate polymer has a volume average particle size of equal to or less than 1.0 micron; and wherein the article has a hardness greater than F.

Another embodiment of the invention provides an article comprising: a thermoplastic or polycarbonate composition comprising the melt blending product of: from 60 to 99 percent by weight of one or more thermoplastic or polycarbonate polymers, and from 40 to 1 percent by weight of an additive comprising a crosslinked (meth)acrylate polymer, wherein the crosslinked (meth)acrylate polymer consisting essentially of at least 99.5 percent by weight derived from methyl methacrylate units, and from greater than zero to less than 0.5 percent by weight derived from one or more multifunctional crosslinking monomers; wherein the crosslinked (meth)acrylate polymer has a volume average particle size of equal to or less than 1.0 micron; and wherein the article has a hardness greater than F.

Another embodiment of the invention provides a method for forming an article consisting essentially of: selecting a thermoplastic or polycarbonate composition comprising the melt blending product of: from 60 to 99 percent by weight of one or more thermoplastic or polycarbonate polymers, and from 40 to 1 percent by weight of an additive comprising a crosslinked (meth)acrylate polymer, wherein the crosslinked (meth)acrylate polymer comprises at least 99.5 percent by weight derived from methyl methacrylate units, and from greater than zero to less than 0.5 percent by weight derived from one or more multifunctional crosslinking monomers; wherein the crosslinked (meth)acrylate polymer has a volume average particle size of equal to or less than 1.0 micron; and forming said polycarbonate composition into said article wherein the article has a hardness of greater than F.

Another embodiment of the invention provides a method for forming an article comprising: selecting a thermoplastic or polycarbonate composition consisting essentially of the melt blending product of: from 60 to 99 percent by weight of one or more thermoplastic or polycarbonate polymers, and from 40 to 1 percent by weight of an additive comprising a crosslinked (meth)acrylate polymer, wherein the crosslinked (meth)acrylate polymer comprises at least 99.5 percent by weight derived from methyl methacrylate units and from greater than zero to less than 0.5 percent by weight derived from one or more multifunctional crosslinking monomers; wherein the crosslinked (meth)acrylate polymer has a volume average particle size of equal to or less than 1.0 micron; and forming said thermoplastic or polycarbonate composition into said article wherein the article has a hardness of greater than F.

Another embodiment of the invention provides a method for forming an article comprising: selecting a thermoplastic or polycarbonate composition comprising the melt blending product of: from 60 to 99 percent by weight of one or more polycarbonate polymers, and from 40 to 1 percent by weight of an additive consisting essentially of a crosslinked (meth) acrylate polymer, wherein the crosslinked (meth)acrylate polymer comprises at least 99.5 percent by weight derived from methyl methacrylate units, and from greater than zero to less than 0.5 percent by weight derived from one or more multifunctional crosslinking monomers; wherein the crosslinked (meth)acrylate polymer has a volume average particle size of equal to or less than 1.0 micron; and forming said polycarbonate composition into said article wherein the article has a hardness of greater than F.

DETAILED DESCRIPTION OF EMBODIMENTS OF THE INVENTION

The following abbreviations are used herein:
"EGDMA" means ethylene glycol dimethacrylate;
"TMPTA" means trimethylolpropane tri(meth)acrylate;
"NaEDTA" means sodium salt of ethylene diamine tetraacetate;
"MMA" means methyl methacrylate; and
"(meth)acrylate" means acrylate or methacrylate.

The instant invention provides a thermoplastic composition, method of producing the same, and articles made therefrom, wherein the articles have improved scratch resistance.

The thermoplastic composition, according to the present invention, comprises from 60 percent to 99 percent by weight of one or more thermoplastic polymers; and from 40 percent to 1 percent by weight of an additive comprising a crosslinked (meth)acrylate polymer, wherein the crosslinked (meth)acrylate polymer comprises at least 99.5 percent by weight derived from methyl methacrylate units, and from greater than zero to less than 0.5 percent by weight derived from one or more multifunctional crosslinking monomers; wherein the crosslinked (meth)acrylate polymer has a volume average particle size of equal to or less than 1.0 micron; and wherein an article produced from the scratch-resistant thermoplastic composition has a hardness of greater than F.

As used herein the term "thermoplastic polymer" means a polymer selected from the group consisting of polycarbonate, polycarbonate blends (such as PC/ABS and PC/PBT), polyesters (such as polyethylene terephthalate (PET)), and polybutylene terephthalate (PBT), polyamides, polystyrene, polylactic acid, blends thereof and combinations thereof.

The thermoplastic composition according to the present invention comprises from 60 percent to 99 percent by weight of one or more thermoplastic polymers based on the total weight of the thermoplastic composition. All individual values and subranges from 60 to 99 percent are included herein and disclosed herein; for example, the total weight percent of the one or more thermoplastic polymers may be from a lower limit of 60, 65, 70, 75, 80, 85, 90 or 95 weight percent to an upper limit of 65, 70, 75, 80, 85, 90, 95 or 99 weight percent, based on the total weight of the thermoplastic composition. For example, the weight percent of the one or more thermoplastic polymers may be in the range of from 60 to 99 weight percent, or in the alternative, the weight percent of the one or more thermoplastic polymers may be in the range of from 60 to 90 weight percent, or in the alternative, the weight percent of the one or more thermoplastic polymers may be in the range of from 65 to 75 weight percent, based on the total weight of the thermoplastic composition.

The thermoplastic composition of the invention further comprises from 1 to 40 percent by weight, based on the total weight of the thermoplastic composition, of an additive comprises one or more crosslinked methylmethacrylate polymer, wherein the methylmethacrylate polymer comprises at least 99.5 percent by weight derived from methyl methacrylate units. All individual values and subranges from 1 to 40 percent are included herein and disclosed herein; for example, the weight percent of the additive may be from a lower limit of 1, 10, 20, 30, or 35 weight percent to an upper limit of 10, 20, 30, or 40 weight percent, based on the total weight of the thermoplastic composition. For example, the weight percent of the additive may be in the range of from 1 to 40 weight percent, or in the alternative, the weight percent of the additive may be in the range of from 10 to 40 weight percent, or in the alternative, the weight percent of the additive may be in the range of from 25 to 35 weight percent, based on the total weight of the polycarbonate composition.

The additive comprises one or more crosslinked methylmethacrylate polymers, wherein the one or more crosslinked methylmethacrylate polymers comprise at least 99.5 percent by weight derived from methyl methacrylate units. All individual values from at least 99.5 weight percent are included herein and disclosed herein; for example, the weight percent of the methyl methacrylate units in the additive may be equal to or greater than 99.5, 99.6, 99.7, 99.8, or 99.9 weight percent based on the total weight of the additive.

The additive further comprises greater than zero and less than or equal to 0.5 percent derived from one or more multifunctional crosslinking monomers. The weight percent range given is for the combination of all such crosslinking monomers when more than one crosslinking agent is present. The weight percent of the one or more crosslinking monomers may be from a lower limit of 0.0005, 0.001, 0.005, 0.01, 0.2, 0.3, 0.4 or 0.49 weight percent to an upper limit of 0.001, 0.01, 0.1, 0.2, 0.3, 0.4 or 0.5 weight percent, based on the total weight of the additive. For example, the weight percent of the one or more crosslinking monomers may be in the range of from 0.0005 to 0.5 weight percent, or in the alternative, the weight percent of the one or more crosslinking monomers may be in the range of from 0.001 to 0.4 weight percent, or in the alternative, the weight percent of the one or more crosslinking monomers may be in the range of from 0.005 to 0.2 weight percent, based on the total weight of the additive. A crosslinking monomer is a monomer that has two or more reactive groups that are capable of participating in a polymerization reaction. Exemplary crosslinking monomers include, but are not limited to, divinylbenzene; vinyl group-containing monomers and allyl compounds including allyl (meth)acrylate, diallyl fumarate, diallyl phthalate, diallylacrylamide, triallyl (iso)cyanurate, and triallyl trimelitate; (poly)alkylene glycol di(meth)acrylate compounds including ethylene glycol dimethacrylate (EGDMA), diethylene glycol dimethacrylate, 1,6-hexanediol di(meth)acrylate, (poly)ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, trimethylolpropane tri(meth)acrylate (TMPTA), dipentaerythritol hexa(meth)acrylate, dipentaerythritol penta(meth)acrylate, and glycerol tri(meth)acrylate and mixtures and combination thereof. In one embodiment, the crosslinking monomer is EGDMA. In an alternative embodiment, the crosslinking monomer is TMPTA.

The crosslinked (meth)acrylate polymer of the additive has a volume average particle size of equal to or less than 1.0 micron. All individual values and subranges from equal to or less than 1.0 micron are included herein and disclosed herein; for example, the volume average particle size of the crosslinked (meth)acrylate polymer may be from a lower limit of 50, 100, or 150 nm to an upper limit of 600, 700, or 1,000 nm. For example, the volume average particle size of the crosslinked (meth)acrylate polymer may be in the range of from 50 to 1000 nm, or in the alternative, the volume average particle size of the crosslinked (meth)acrylate polymer may be in the range of from 100 to 700 nm, or in the alternative, the volume average particle size of the crosslinked (meth)acrylate polymer may be in the range of from 150 to 600 nm, or in the alternative, the volume average particle size of the crosslinked (meth)acrylate polymer may be in the range of from 150 to 250 nm.

In some embodiments of the invention, the crosslinked (meth)acrylate polymer has a glass transition temperature (Tg) from 90° C. to 130° C. (measured by DSC, second heat). All individual values and subranges from 90° C. to 130° C. are included herein and disclosed herein; for example, the Tg (measured by DSC, second heat) of the crosslinked (meth) acrylate polymer may be from a lower limit of 90, 95, 100, 105, 110, 115, 120, or 125° C. to an upper limit of 95, 100, 105, 110, 115, 120, 125 or 130° C. For example, the Tg of the crosslinked (meth)acrylate polymer may be in the range from 90 to 130° C., or in the alternative, the Tg of the crosslinked (meth)acrylate polymer may be in the range from 95 to 125° C., or in the alternative, the Tg of the crosslinked (meth) acrylate polymer may be in the range from 100 to 120° C.

In some embodiments of the invention, the crosslinked (meth)acrylate polymer is obtained by an emulsion polymerization process.

Articles made from the inventive thermoplastic composition have a hardness of greater than F. All individual values and sub-ranges greater than F are included herein and disclosed herein; for example, the hardness may be greater than F; in the alternative, the hardness may be equal to or greater than H; or in the alternative, the hardness may be equal to or greater than 2H. As used herein, the term "hardness" refers to pencil hardness measured as described below.

In the process for producing the thermoplastic composition, the one or more thermoplastic polymers and the additive are melt-kneaded, for example, via a Haake mixer, a Banbury mixer, or an extruder, e.g. twin screw extruder. In some embodiments, the additive is physically, and preferably uniformly, dispersed in the one or more thermoplastic polymers.

The thermoplastic compositions of the present invention may further include one or more end use additives, including, but not limited to, antistatic agents, antimicrobial agents, color enhancers, dyes, colorants, lubricants, fillers, flame retardants, heat stabilizers, pigments, primary antioxidants, secondary antioxidants, processing aids, UV stabilizers, surfactants, nucleating agents, coupling agents, compatibilizers, slip agents, admixtures, hard coatings, impact modifiers, blends thereof, and combinations thereof.

The inventive thermoplastic compositions may contain any amounts of the above additives. The inventive thermoplastic compositions may comprise from 0 to 20 percent by the combined weight of such additives, based on the weight of the inventive thermoplastic composition including such additives. All individual values and sub-ranges from about 0 to about 20 weight percent are included herein and disclosed herein; for example, the inventive thermoplastic compositions may compromise from 0 to 7 weight percent by the combined weight of additives; or in the alternative, the combined weight of additives many range from 0 to 10 weight percent; or in the alternative, the combined weight of additives many range from 0 to 5 weight percent; or in the alternative, the combined weight of additives many range from 0 to 13 weight percent; or in the alternative, the combined weight of additives many range from 0 to 20 weight percent; or in the alternative, the combined weight of additives many range from 2 to 8 weight percent; or in the alternative, the combined weight of additives many range from 5 to 10 weight percent, based on the weight of the inventive thermoplastic composition including such additives.

The thermoplastic compositions disclosed herein can be used to manufacture durable articles for the automotive, construction, medical, food and beverage, electrical appliance, business machine, and consumer markets. In some embodiments, the thermoplastic compositions are used to manufacture durable parts or articles selected from toys, computer housings, computer and/or electronic devices such as hand-held personal devices, portable music players, laptop computers and the like, household appliances, power tool housing, automotive bumpers, refillable water bottles, office supplies and kitchen wares. Additionally, the thermoplastic compositions of the present invention may also be formed into consumer and sporting goods.

The thermoplastic compositions can be used to prepare these durable parts or articles with known polymer processes such as extrusion (e.g., sheet extrusion and profile extrusion); molding (e.g., injection molding, rotational molding, and blow molding); and blown film and cast film processes. In general, extrusion is a process by which a polymer is propelled continuously along a screw through regions of high temperature and pressure where it is melted and compacted, and finally forced through a die. The extruder can be a single screw extruder, a multiple screw extruder, a disk extruder or a ram extruder. The die can be a film die, blown film die, sheet die, pipe die, tubing die or profile extrusion die.

Injection molding is also widely used for manufacturing a variety of plastic parts for various applications. In general, injection molding is a process by which a polymer is melted and injected at high pressure into a mold, which is the inverse of the desired shape, to form parts of the desired shape and size. The mold can be made from metal, such as steel and aluminum.

Molding is generally a process by which a polymer is melted and led into a mold, which is the inverse of the desired shape, to form parts of the desired shape and size. Molding can be pressure-less or pressure-assisted.

Rotational molding is a process generally used for producing hollow plastic products. By using additional post-molding operations, complex components can be produced as effectively as other molding and extrusion techniques. Rotational molding differs from other processing methods in that the heating, melting, shaping, and cooling stages all occur after the polymer is placed in the mold, therefore no external pressure is applied during forming.

Blow molding can be used for making hollow plastics containers. The process includes placing a softened polymer in the center of a mold, inflating the polymer against the mold walls with a blow pin, and solidifying the product by cooling. There are three general types of blow molding: extrusion blow molding, injection blow molding, and stretch blow molding. Injection blow molding can be used to process polymers that cannot be extruded. Stretch blow molding can be used for difficult to blow crystalline and crystallizable polymers such as polypropylene.

In some embodiments of the invention, the thermoplastic composition is processed at a temperature of equal to or greater 230° C. All individual values and sub-ranges of equal to or greater than 230° C. are included herein and disclosed herein; for example, the inventive thermoplastic compositions may be processed at a temperature equal to or greater than 230° C.; or in the alternative, the inventive thermoplastic compositions may be processed at a temperature equal to or greater than 250° C.; or in the alternative, the inventive thermoplastic compositions may be processed at a temperature equal to or greater than 270° C.; or in the alternative, the inventive thermoplastic compositions may be processed at a temperature equal to or greater than 290° C.; or in the alternative, the inventive thermoplastic compositions may be processed at a temperature equal to or greater than 300° C. For example, the thermoplastic composition may be processed at a temperature from 230 to 300° C.; or in the alternative, the inventive thermoplastic compositions may be processed at a temperature in the range from 280 to 350° C.; or in the alternative, the inventive thermoplastic compositions may be processed at a temperature in the range from 280 to 325° C.

EXAMPLES

The following examples illustrate the present invention but are not intended to limit the scope of the invention. The examples of the instant invention demonstrate that the inventive composition, modified polycarbonate compositions, exhibit scratch resistance over unmodified polycarbonates.

The following emulsion polymerization process was used to prepare the additive used in preparation of the polycarbonate composition inventive examples:

Preparation of Additive used in Inventive Example 1

1600 grams of deionized water, 0.15 grams of NaEDTA (sodium salt of ethylene diamine tetra-acetate) and 0.06 grams of iron sulfate heptahydrate were charged to a round bottom 5 liter glass reactor. The mixture in the glass reactor was stirred at 100 rpm and heated to 75° C. with nitrogen sparging for 30 minutes, followed by the addition of 0.6 gms of sodium dithionite in 50 grams water. The mixture in the glass reactor was maintained at 75($\pm$2)° C. A monomer emulsion prepared by mixing: (1) 1500 grams of methyl methacrylate, 0.018 grams of ethylene glycol dimethacrylate (EGDMA), and 207 grams of sodium dodecylbenzene sulfonate (10% solution) in 720 grams of water, was then fed into the glass reactor over a period of 4 hours. In the case of inventive and comparative examples, variable amounts of EGDMA or TMPTA crosslinkers were added to this monomer emulsion mixture. At the same time, (2) a solution of 4.5 grams of sodium persulfate in 50 grams of water was fed into the glass reactor over a period of 5 hours. That is, the feeds of components (2) continued for 1 hour following the termination of the feed of the monomer emulsion. During the feed of components (1) and (2), the temperature of the mixture in the glass reactor was maintained at 75±2° C. After all of the components (1)-(2) were fed into the glass reactor, the temperature of the mixture in the glass reactor, a latex, was reduced to 60° C. and 7.5 grams of Irganox 1076 powder was added. The latex was held at that temperature for 30 minutes before cooling to 40° C. The pH of the latex was then adjusted to from 6.8 to 7.0 by first adding 0.2 wt % (based on total polymer) monosodium phosphate solution (10% soln.) and then 0.6 wt % (based on total polymer) disodium phosphate solution (10% soln.) drop-wise until the pH was brought into the desired range. The latex was then filtered and isolated by freeze drying to a moisture content of <0.5 percent by weight. The volume average particle size was measured via dynamic light scattering and found to be 152 nm. Inventive Examples 2-6 were prepared using the general method described above except that the weight percent of the EDMA was varied, as shown in detail in Table 1. Inventive Examples 7-9 were prepared using the general method described above except that TMPTA was used as the crosslinking monomer and the weight percents were varied, as also shown in detail in Table 1.

Each of the Inventive Examples were prepared by melt blending the additive with LEXAN 143 (a Bisphenol A-based polycarbonate resin available from SABIC Innovative Plastics) in a twin screw extruder at 280° C. The resulting strands were pelletized and injection molded into 3 mm thick plaques at 290° C. with mold temperatures of 90° C. Table 1 provides the compositions and hardness for each of the polycarbonate composition Inventive Examples and the molecular weight (Mw in grams/mole) and the volume average particle size (PS) of the crosslinked (meth)acrylate polymer component of each of the Inventive Examples.

Comparative Example 1 is a plaque formed solely from Lexan 143 with no additive. Comparative Example 2 is a plaque formed from a non-crosslinked polymethylmethacrylate polymer (MW=14,000 g/mol) blended at the 20% level with polycarbonate. Comparative Examples 3-4 include crosslinking monomer EGDMA and Comparative Example 5 includes crosslinking monomer TMPTA, each at levels greater than 0.5 weight percent based on the total weight of the additive. The compositions and hardness for each of the polycarbonate composition Comparative Examples and the molecular weight (Mw in grams/mole) and the volume average particle size (PS) of the crosslinked (meth)acrylate polymer component of each of Comparative Examples 3-5 are shown in Table 2.

lowed except that the test was conducted on an injection molded test specimen in the shape of a plaque with dimensions 3×50×50 mm. The pencil was held at a 45° angle and drawn across the surface of the plaque away from the operator starting with the softest pencil. The substrate hardness would be reported as the hardness of the hardest pencil that did not scratch the surface. The range of interest reported here is in going from soft to harder (B, HB, F, H, 2H, 3H, 4H.)

TABLE 1

| Example | Composition | Hardness | $Mw \times 10^5$ (g/mol) | PS (nm) |
|---|---|---|---|---|
| Inventive Example 1 | 70 weight percent Lexan 143 and 30 weight percent additive (99.9988 weight percent MMA crosslinked with 0.0012 weight percent EGDMA) | H | 3.7 | 185 |
| Inventive Example 2 | 80 weight percent Lexan 143 and 20 weight percent additive (99.9988 weight percent MMA crosslinked with 0.0012 weight percent EGDMA) | H | 12.0 | 200 |
| Inventive Example 3 | 70 weight percent Lexan 143 and 30 weight percent additive (99.9985 weight percent MMA crosslinked with 0.0015 weight percent EGDMA) | H | 4.5 | 186 |
| Inventive Example 4 | 70 weight percent Lexan 143 and 30 weight percent additive (99.9995 weight percent MMA crosslinked with 0.0005 weight percent EGDMA) | H | 3.9 | 209 |
| Inventive Example 5 | 70 weight percent Lexan 143 and 30 weight percent additive (99.995 weight percent MMA crosslinked with 0.005 weight percent EGDMA) | H | 3.9 | 192 |
| Inventive Example 6 | 70 weight percent Lexan 143 and 30 weight percent additive (99.95 weight percent MMA crosslinked with 0.05 weight percent EGDMA) | 2H | 4.6 | 191 |
| Inventive Example 7 | 70 weight percent Lexan 143 and 30 weight percent additive (99.5 weight percent MMA crosslinked with 0.5 weight percent EGDMA) | 2H | 3.0 | 237 |
| Inventive Example 8 | 70 weight percent Lexan 143 and 30 weight percent additive (99.9995 weight percent MMA crosslinked with 0.0005 weight percent TMPTA) | 2H | 4.3 | 197 |
| Inventive Example 9 | 70 weight percent Lexan 143 and 30 weight percent additive (99.995 weight percent MMA crosslinked with 0.005 weight percent TMPTA) | H | 4.1 | 200 |
| Inventive Example 10 | 70 weight percent Lexan 143 and 30 weight percent additive (99.9 weight percent MMA crosslinked with 0.1 weight percent TMPTA) | H | 4.4 | 197 |

TABLE 2

| Example | Composition | Hardness | $Mw \times 10^{-5}$ (g/mol) | Particle Size PS (nm) |
|---|---|---|---|---|
| Comparative Example 1 | 100 weight percent LEXAN 143 | B | — | — |
| Comparative Example 2 | 80 weight percent LEXAN 143 and 20 weight percent additive (100 weight percent MMA) | F | 0.145 | 237 |
| Comparative Example 3 | 70 weight percent LEXAN 143 and 30 weight percent additive (96 weight percent MMA crosslinked with 4 weight percent EGDMA) | F | 0.73 | 243 |
| Comparative Example 4 | 70 weight percent LEXAN 143 and 30 weight percent additive (90 weight percent MMA crosslinked with 10 weight percent TMPTA) | F | No soluble fraction | 219 |

Test Methods

Hardness

Hardness, as used herein, refers to hardness as determined according to ASTM D3363-05 "Standard Test Method for Film Hardness by Pencil Test." This standard test was fol- The volume average particle size was measured on very dilute latexes (diluted to 0.001% solids) with a BI 90 (Brookhaven Instruments, Holtsville, N.Y.) particle size detector, utilizing Dynamic Light Scattering (15° and 90° scattering angles) and a laser light source. The signal is detected by a photodiode array and the data analyzed with a built in correlator. The volume average particle sizes of the resulting latexes were measured to be in the range of 125-300 nm.

GPC Molecular Weight

The term "molecular weight" as used herein refers to peak average molecular weight as determined by gel permeation chromatography against narrow molecular weight polystyrene standards in tetrahydrofuran solvent at 25° C. using Polymer Laboratories data manipulation software.

The present invention may be embodied in other forms without departing from the spirit and the essential attributes thereof, and, accordingly, reference should be made to the appended claims, rather than to the foregoing specification, as indicating the scope of the invention.

We claim:

1. A thermoplastic composition comprising:
   from 60 percent to 99 percent by weight of one or more polycarbonates; and
   from 40 percent to 1 percent by weight of an additive comprising a crosslinked (meth)acrylate polymer, wherein the crosslinked (meth)acrylate polymer comprises at least 99.5 percent by weight derived from methyl methacrylate units, and from greater than zero to less than 0.5 percent by weight derived from one or more multifunctional crosslinking monomers;
   wherein the crosslinked (meth)acrylate polymer has a volume average particle size in the range of from 185 to 237 nm, and, wherein the crosslinked (meth)acrylate polymer has a Tg from 90° C. and to 115° C. (measured by DSC, second heat); and
   wherein an article produced from the thermoplastic composition has a hardness of greater than F; and wherein the crosslinked (meth)acrylate polymer is free of chain transfer agents.

2. The thermoplastic composition according to claim 1, wherein the crosslinked (meth)acrylate polymer is substantially free of co-monomer.

3. The thermoplastic composition according to claim 1, wherein the crosslinked (meth)acrylate polymer is obtained by an emulsion polymerization reaction.

4. The thermoplastic composition according to claim 1, wherein the additive comprises (A) from greater than zero to less than or equal to 0.5 percent by weight EGDMA or (B) from greater than zero to less than or equal to 0.1 percent by weight TMPTA.

5. The thermoplastic composition according to claim 1, wherein the crosslinked (meth)acrylate polymer has a Mw from $2.7 \times 10^5$ to $1.5 \times 10^6$ g/mol.

6. The thermoplastic composition according to claim 1, wherein the thermoplastic composition has a hardness of H or greater.

7. An article comprising:
   a thermoplastic composition comprising the melt blending product of:
      from 60 to 99 percent by weight of one or more polycarbonates and from 40 to 1 percent by weight of an additive comprising a crosslinked (meth)acrylate polymer, wherein the crosslinked (meth)acrylate polymer comprises at least 99.5 percent by weight derived from methyl methacrylate units, and from greater than zero to less than 0.5 percent by weight derived from one or more multifunctional crosslinking monomers;
   wherein the crosslinked (meth)acrylate polymer has a volume average particle size in the range of from 185 to 237 nm, and, wherein the crosslinked (meth)acrylate polymer has a Tg from 90° C. and to 115° C. (measured by DSC, second heat); and wherein the article has a hardness greater than F; and wherein the crosslinked (meth)acrylate polymer is free of chain transfer agents.

8. A method for forming an article comprising:
   selecting a thermoplastic composition comprising the melt blending product of:
      from 60 to 99 percent by weight of one or more polycarbonates, and from 40 to 1 percent by weight of an additive comprising a crosslinked (meth)acrylate polymer, wherein the crosslinked (meth)acrylate polymer comprises at least 99.5 percent by weight derived from methyl methacrylate units, and from greater than zero to less than 0.5 percent by weight derived from one or more multifunctional crosslinking monomers; wherein the crosslinked (meth)acrylate polymer has a volume average particle size in the range of from 185 to 237 nm, and, wherein the crosslinked (meth)acrylate polymer has a Tg from 90° C. and to 115° C. (measured by DSC, second heat); and
   forming said thermoplastic composition into said article wherein the article has a hardness of greater than F; and wherein the crosslinked (meth)acrylate polymer is free of chain transfer agents.

* * * * *